UNITED STATES PATENT OFFICE.

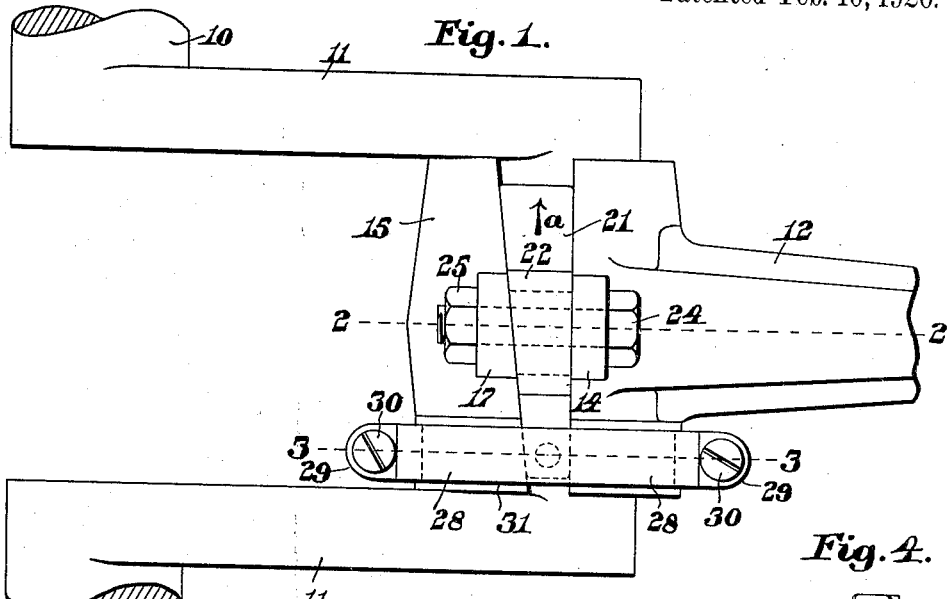

HARRY E. PETRILLI, OF BOSTON, MASSACHUSETTS, ASSIGNOR OF ONE-HALF TO EMANUEL P. SCIGLIANO, OF EAST BOSTON, MASSACHUSETTS.

CRANK-ROD CONNECTION.

1,330,607.  Specification of Letters Patent.  Patented Feb. 10, 1920.

Application filed April 17, 1919. Serial No. 291,131.

*To all whom it may concern:*

Be it known that I, HARRY E. PETRILLI, a subject of the King of Italy, and a resident of Boston, in the county of Suffolk and Commonwealth of Massachusetts, have invented certain new and useful Improvements in Crank-Rod Connections, of which the following is a specification.

This invention relates to connections between the crank rod and the crank shaft of an engine or other machine, the object being to provide means whereby the connection may be adjusted and made smaller when the crank shaft becomes worn thereby insuring a suitable bearing surface and preventing rattling.

The invention consists in interposing between the end of the connecting rod and its cap, slidable wedge-shaped members each provided with a projection extending into a cam groove of an adjusting ring movably mounted on the hub of the connecting rod.

The invention further consists of certain novel features of construction and combination of parts which will be readily understood by reference to the description of the drawings and to the claims to be hereinafter given.

For the purpose of illustrating the invention, one preferred form thereof is illustrated in the drawings, this form having been found to give satisfactory and reliable results, although it is to be understood that the various instrumentalities of which the invention consists can be variously arranged and organized, and that the invention is not limited to the precise arrangement and organization of the instrumentalities as herein shown and described, except as required by the scope of the appended claims.

Of the drawings:

Figure 1 represents a plan of a crank, a portion of a crank rod and the adjustable connection between said crank and rod.

Fig. 2 represents a vertical section of same on line 2, 2 on Fig. 1.

Fig. 3 represents a vertical section of same on line 3, 3 on Fig. 1.

Fig. 4 represents an elevation of a slidable separator, and

Fig. 5 represents an elevation of member for adjusting said slidable member.

Similar characters indicate like parts throughout the several figures of the drawings.

In the drawings 10 is a crank shaft having formed therein a crank 11.

12 is the end of a crank rod having a semi-cylindrical depression 13 formed therein and provided with outwardly extending ears 14.

The crank rod 12 is provided with a cap 15 having a semi-cylindrical depression 16 formed therein and provided with ears 17. The semi-cylindrical depressions 13 and 16 have each a lining of babbitt 18 forming a bearing 19 for the cylindrical portion 20 of the crank 11.

Between the ears 14 and 17 are interposed the slidable separators 21 each separator being wedge-shaped as indicated in Fig. 1 of the drawings.

Each wedge-shaped separator 21 is provided with an outwardly extending ear 22 having formed therein an elongated slot 23 through which extends a clamping bolt 24, said clamping bolt also extending through ears 14 and 17 and having threaded thereto a clamping nut 25. One end of each wedge-shaped separator 21 is provided with a projection or outwardly extending pin 26 adapted to be positioned within a cam groove 27 formed in the adjusting ring 28. This ring 28 is formed in two parts, each part having outwardly extending ears 29 and a cam groove 27.

Clamp screws 30 extend through the ears 29 of one part and are threaded to the ears 29 of the other part of said adjusting ring 28. This ring 28 is mounted in an annular groove 31 formed partially in the connecting rod 12 and partially in the cap 15 therefor.

When the crank rod is assembled upon the crank 11, the clamp screws 30 are turned sufficiently to force the two parts of the ring 28 together and clamp them upon the periphery of the projecting portions of the crank rod 12 and cap 15.

As the pins 26 are positioned within the cam grooves 27, it is obvious that when the ring 28 is locked to the rod 12 and cap 15, no end movement can be imparted to the slidable wedge-shaped separators 21.

To further insure against end movement of these separators 21, the clamp nuts 25 are turned sufficiently upon the bolts 24 to move the ears 14 and 17 into frictional contact with the ears 22.

When the bearing 19 becomes worn the bolts 24 are loosened and the clamp screws 30 are turned to allow the two parts of the ring 28 to separate and thereby permit said ring to be freely moved about its axis within the annular groove 31.

As this movement is imparted to the ring 28, the cam grooves 27, acting upon the pins 26, will move the wedge-shaped separators 21 in the direction of the arrow "$a$" on Fig. 1 of the drawings.

When the wedge-shaped members 21 have been moved sufficiently in the direction of the arrow "$a$", the clamping bolts 24 and nuts 25 will be actuated to force the ears 14 and 17 again into frictional contact with the ears 22, thus preventing any further end movement of said wedge-shaped members 21.

The two parts of the ring 28 will then be again moved toward each other by means of the screws 30 and clamped against the peripheral wall of the annular groove 31 thus preventing any further accidental rotation of said ring 28.

By means of these adjustments as soon as the bearing 19 becomes worn, the cap 15 may be moved toward the crank rod 12 and a new bearing surface formed in the Babbitt linings 18.

This will prevent any rattling of the parts when the crank 11 is in operation and provide for the cylindrical portion 20 a good bearing surface under all conditions.

It is believed that the operation and many advantages of the invention will be fully understood without further explanation.

Having thus described my invention, I claim:

1. The combination of a crank shaft; a crank rod having a split bearing inclosing said crank shaft; a wedge member slidable endwise between two adjacent edges of said bearing; and means revoluble about the axis of said bearing and adapted to impart end movement to said wedge member whereby the diameter of said bearing may be reduced.

2. The combination of a crank shaft; a crank rod having a semi-cylindrical hub; a cap for said rod extending to the ends of said hub; slidable wedge-shaped members between said rod and cap; and means revoluble about said semi-cylindrical hub and one end of said cap and coacting with said slidable members to move them endwise.

3. The combination of a crank shaft having a crank formed thereon; a crank rod; a cap therefor forming, with a depression in the end of said crank rod, a bearing for said crank; slidable wedge-shaped members between said rod and cap; and means mounted on said rod and cap revoluble about the axis of said bearing for moving said slidable members.

4. The combination of a crank shaft having a crank formed thereon; a crank rod; a cap therefor; bolts for securing said cap to said rod; wedge-shaped members between said rod and cap having elongated slots through which said bolts extend and slidable in paths parallel with the axis of the bearing for said crank; and means rotatable about the axis of said bearing for moving said slidable members.

5. The combination of a crank shaft; a crank rod; a cap therefor; slidable wedge-shaped members interposed between said cap and rod; a ring movably mounted upon said cap and rod; and means interposed between said ring and slidable members for imparting end movement to the latter whenever said ring is moved.

6. The combination of a crank shaft; a crank rod; a cap therefor; slidable wedge-shaped members interposed between said cap and rod; each provided with a projection; and a movable member mounted on said rod and provided with cam grooves into which said projections extend.

7. The combination of a crank shaft; a crank rod; a cap therefor; slidable wedge-shaped members interposed between said cap and rod; each provided with a projection; a divided ring movably mounted on said rod and provided with cam grooves into which said projections extend; and means for locking together the two parts of said ring.

Signed by me at 4 Post Office Square, Boston, Mass., this 16th day of April, 1919.

HARRY E. PETRILLI.

Witnesses:
WALTER E. LOMBARD,
NATHAN C. LOMBARD.